Feb. 1, 1949.　　　　J. M. ROTH　　　　2,460,397

PUMP BY-PASS VALVE ASSEMBLY

Filed July 22, 1944

Inventor:
Jay M. Roth
By Edward C. Fitzhaugh
Atty.

Patented Feb. 1, 1949

2,460,397

UNITED STATES PATENT OFFICE 2,460,397

PUMP, BY-PASS VALVE ASSEMBLY

Jay M. Roth, Euclid, Ohio, assignor, by mesne assignments, to Borg-Warner Corporation, Chicago, Ill., a corporation of Illinois Application July 22, 1944, Serial No. 546,100

3 Claims. (Cl. 277—61)

1

This invention relates to an improvement in by-pass and relief valve arrangements particularly adapted for use with rotary fluid pumps wherein it is desired to effect manual transfer of fluid around the pump when stationary as well as to relieve excess output pressure back to the inlet of the pump when operating.

It is an object of this invention to provide an improved, simplified and efficient by-pass and relief valve assembly particularly adapted for use in conjunction with rotary vane type pumps.

It is a more particular object to provide in a combination of the present type an arrangement of by-pass and relief valve assembly requiring at most two reciprocable valves proper, the ports and valve seats all being formed in or carried by a single compact unitary partition arrangement provided with means for guiding both valves.

Figure 1:
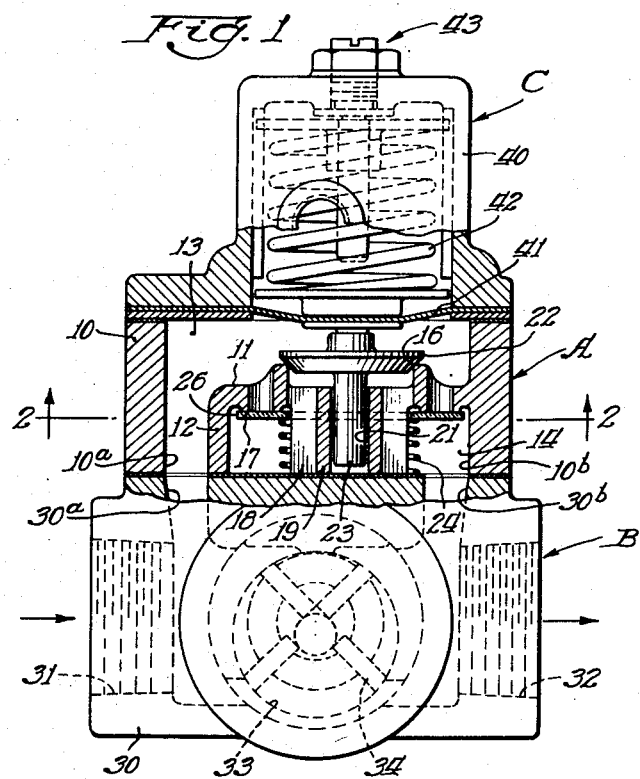
Figure 2:
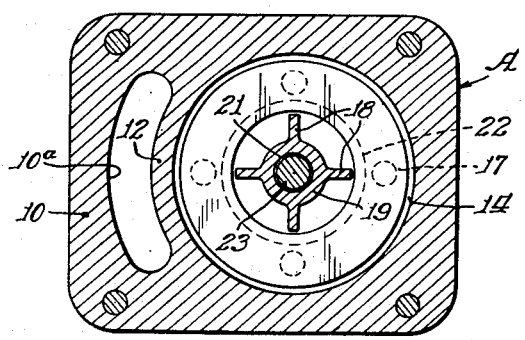

Other and more particular objects, advantages and uses of my invention will become apparent from a reading of the following specification taken in connection with the appended drawing which forms a part thereof and wherein:

Fig. 1 is a broken away vertical section view showing an arrangement incorporating a preferred embodiment of my invention; and Fig. 2 is a cross-sectional view taken substantially on the line 2—2 of Fig. 1.

Referring to the figures of the drawing my improved by-pass and relief valve assembly is indicated generally at A mounted in operative relationship to a rotary vane type pump B, and in turn having mounted thereon a control assembly C for controlling the operation of the relief valve forming a part of assembly A.

By-pass and relief valve assembly A comprises a housing 10 having a partition therein including a horizontal portion 11 and a vertically extending portion 12, this partition functioning to divide the interior of the housing 10 into a first chamber 13 and a second chamber 14. The horizontal portion 11 of the partition is orificed to provide a relief passage terminating in relief valve seat 16 surrounding which there is additionally provided a plurality of smaller orifices terminating in oppositely facing by-pass valve seats 17. Extending radially inwardly from adjacent relief valve seat 16 are a plurality of web-like circumferentially spaced walls 18 carrying at the radial inner terminal thereof a cylindrical valve stem guide 19 formed internally with cylindrical bore 21 for guiding cooperation with the valve stem of the relief valve. Disc type relief valve 22 cooperates with valve seat 16 and has extending coaxially

2 therefrom a valve guide stem 23 for reciprocable guided relation with guide bore 21.

Special attention is directed to the provision of a single flat sheet material valve 26 having an annular or washer shape and being embraceably received about the outer radial periphery of web walls 18 in guided relation thereto for simultaneous cooperation with all of the by-pass valve seats 17.

A single coil compression spring 24 embraces the outer radial periphery of the web-like wall members 18 and engages the underside of valve 26 normally urging the same lightly in the direction of engagement of all of the valve seats 17. By virtue of the relatively large diameter of coil compression spring 24 the same may be made of very light gauge wire with the result that the back pressure offered by valve 26 is very small. When pump B is in operation by-pass valve 26 is held firmly in engagement with valve seat 17 and comes into operation only with the pump in stationary or inoperative position when it is desired to manually pump fluid, such as gasoline, around the stationary pump and through valve seats 17, a very small effort being required to overcome the resistance of valve 26 in view of the present arrangement. Housing 10 is formed with orifices 10a and 10b complementary to corresponding orifices in the housing of pump B and functioning to provide communication respectively with the first chamber 13 and with the second chamber 14.

Pump assembly B may include a pump housing proper 30 having a normal inlet 31 and normal outlet 32 interposed between which is a generally cylindrical pumping chamber 33 containing a fluid impelling assembly comprising reciprocable vanes 34. Passages 30a and 30b respectively place the normal inlet of the pump in communication with inlet passage 10a of the first chamber 13 and with the passage 10b in communication with the second chamber 14 of by-pass and relief valve assembly A.

It will be apparent that the unit may be arranged for reverse direction of rotation by turning by-pass and relief valve assembly A 180° to reverse the relationship between passages 10a, 10b, 30a, and 30b.

The usual form of control assembly C may be employed for effecting the necessary balance with reference to relief valve 22 and this may include a housing 40 carried by the housing 10 having interposed therebetween a flexible diaphragm 41 urged in the direction of relief valve 22 by a coil compression spring 42 the compression of which may be adjusted by means of nut and bolt assembly 43.

The several housing units 10, 30, and 40 may be readily fastened together in assembled relation by means of the usual cap screws or other conventional means not shown.

While my invention has been described in connection with a specific embodiment thereof, it is to be understood that this is by way of example and that the scope of my inventon lis to be defined by the appended claims.

1. In a relief and by-pass valve assembly for a rotary-type fluid pump, said assembly comprising a housing having a partition dividing the interior thereof into a first chamber and a second chamber, a generally centrally disposed orifice in said partition terminating on the first chamber side in a relief valve seat, a plurality of smaller orifices in said partition surrounding said first orifice and terminating on the second chamber side thereof in a corresponding plurality of by-pass valve seats, a plurality of web-like wall portions extending radially inwardly from adjacent said relief valve seat and supporting on the radial inner terminals thereof a generally cylindrical guide, a disc-type relief valve for cooperation with said relief valve seat and having a coaxially extending cylindrical guide stem for cooperation with said guide, a single flat washer-like valve guidably embracing the outer radial extremity of said web-like walls and cooperating with all of said by-pass valve seats, a single coil compression spring embraceably and guidably received about the radial outer periphery of said web-like wall portions effective to urge said single washer-like valve in the direction of all of said by-pass valve seats and a second single coil compression spring urging said relief valve in the direction of said relief valve seat.

2. A relief and by-pass valve assembly for a fluid pump comprising a housing; a partition in said housing having a central passage terminating in a relief-valve seat; guide means in said central passage having radial portions projecting therefrom across said passage; a plurality of by-pass passages in said partition arranged annularly around said relief-valve seat and terminating in by-pass valve seats; a relief-valve guided by said guide means for cooperation with said relief-valve seat; a washer defining a by-pass valve guided by said radial portions for cooperation with said by-pass valve seats; and coil compression springs in said housing on opposite sides of said partition, said springs being effective to urge said relief-valve and said washer respectively in directions towards their seats.

3. A relief and by-pass valve assembly as defined in claim 2 wherein the guide means for the relief-valve comprises a cylindrical boss arranged axially in the central passage of the partition for receiving a stem on said relief-valve, and the radial portions of the guide means comprise webs extending longitudinally of said boss for supporting said boss.

JAY M. ROTH.

REFERENCES CITED

The following references are of record in the file of this patent:

UNITED STATES PATENTS

| Number | Name | Date |
|---|---|---|
| 554,604 | Morgan | Feb. 11, 1896 |
| 986,122 | Astrom | Mar. 7, 1911 |
| 2,349,137 | Brown | May 16, 1944 |

FOREIGN PATENTS

| Number | Country | Date |
|---|---|---|
| 426,859 | Great Britain | Apr. 10, 1935 |
| 617,376 | Germany | Aug. 17, 1935 |